(12) United States Patent
Tsutsumi

(10) Patent No.: US 7,002,711 B2
(45) Date of Patent: Feb. 21, 2006

(54) IMAGE READING DEVICE AND METHOD

(75) Inventor: Kazuyoshi Tsutsumi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 860 days.

(21) Appl. No.: 09/942,698

(22) Filed: Aug. 31, 2001

(65) Prior Publication Data

US 2003/0043418 A1    Mar. 6, 2003

(51) Int. Cl.
*H04N 1/36*    (2006.01)
(52) U.S. Cl. .................... 358/412; 358/474; 358/498; 358/496; 358/497; 399/367; 399/392; 399/208; 399/396
(58) Field of Classification Search ............... 358/412, 358/474, 296, 498, 486, 496; 399/208, 236, 399/396, 367, 377, 374, 392, 371; 271/259; 400/279
See application file for complete search history.

(56) References Cited

U.S. PATENT DOCUMENTS

| | | | | | |
|---|---|---|---|---|---|
| 4,295,167 | A | * | 10/1981 | Wiggins | 358/412 |
| 4,748,514 | A | * | 5/1988 | Bell | 358/486 |
| 5,161,029 | A | * | 11/1992 | Yamanishi | 358/296 |
| 5,198,909 | A | * | 3/1993 | Ogiwara et al. | 358/412 |
| 5,365,323 | A | * | 11/1994 | Ando | 399/367 |
| 5,547,295 | A | * | 8/1996 | Kanemitsu | 400/279 |
| 5,687,010 | A | * | 11/1997 | Van Tilborg et al. | 358/496 |
| 5,796,496 | A | * | 8/1998 | Ono | 358/498 |
| 5,920,381 | A | * | 7/1999 | Katsuta | 271/259 |
| 6,081,687 | A | * | 6/2000 | Munemori et al. | 399/374 |
| 6,233,068 | B1 | * | 5/2001 | Kondo | 358/498 |
| 6,256,473 | B1 | * | 7/2001 | Kamanuma et al. | 399/367 |

FOREIGN PATENT DOCUMENTS

JP        7-25517        1/1995

* cited by examiner

*Primary Examiner*—Kimberly Williams
*Assistant Examiner*—Beniyam Menberu
(74) *Attorney, Agent, or Firm*—Foley & Lardner LLP

(57) ABSTRACT

An image reading device is operable in a manually placed document reading mode offered by a manually placed document reading section and an ADF document reading mode offered by an ADF document reading section. Reading mode detecting section detects in which mode a document to be read is in. First reading-speed setting section sets a reading speed of the ADF document reading section to a predetermined reading speed, upon detection by the reading mode detecting means that the document to be read is in the ADF document reading mode. Second reading-speed setting section sets a reading speed of the manually placed document reading section to a predetermined reading speed sufficient to reduce image vibration caused by reading by the manually placed document reading section, upon detection by the reading mode detecting section that the document to be read is in the manually placed document reading mode.

15 Claims, 5 Drawing Sheets

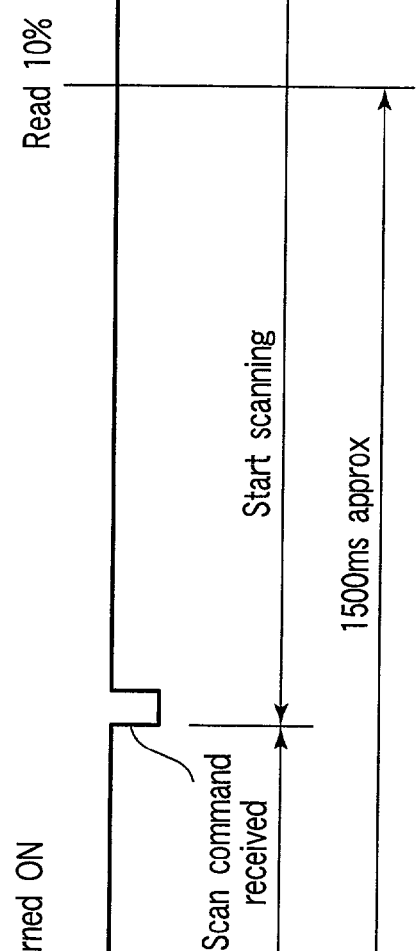
FIG. 4A
FIG. 4B

IMAGE READING DEVICE AND METHOD

BACKGROUND OF THE INVENTION

The present invention relates to an image reading device, and more specifically to an image reading device such as a scanner utilized in an electronic copier for example and other image forming apparatuses.

Conventionally, in an image reading device such as a scanner utilized in an electronic copier for example and other image forming apparatuses, a document placed on a document table made of a transparent sheet of glass is illuminated by an illumination lamp, and the reflected light is captured by a CCD line sensor for photoelectric transformation, whereby reading of a document image is performed.

The illuminating lamp and a mirror for guiding the reflected light from the document to the CCD line sensor are provided on a scanning carriage.

With such an arrangement in the image reading device such as the scanner, when reading the document placed on the document table, the document is read line by line in main scanning directions while the scanning carriage is moved in a sub-scanning direction, whereby reading of an entire image of the document is performed.

Further, conventionally, in an image reading device (hereinafter called a scanner) provided with an automatic document feeder (hereinafter called an ADF), when reading a manually placed document which is manually put on the glass serving as the document table, the scanning carriage is moved in the sub-scanning direction as described above, whereas the scanning carriage is held stationary during the reading operation in which the document is fed by the ADF.

In the above arrangement, reading of the document fed by the ADF and the reading of the document manually placed on the table are performed at the same speed.

For example, suppose that the document is to be read at a magnification rate of 100% to compare the ADF feeding mode and reading in a manual mode. The speed of the roller which feeds the document in the ADF feeding and the moving speed of the scanning carriage relative to the placed document are the same.

However, according to the above method, when transporting the document by the ADF, one component is driven at a certain speed, and when transporting the scanning carriage, another component is driven at the same speed. Such an arrangement tends to place a demanding specification on both the components.

Therefore, unwanted limitations are placed on certain conditions, such as specifications for a roller driving motor and a scanning carriage driving motor, or certain requirements call for the use of an expensive part or member.

Take, for example, a high speed scanner utilized in a 65 cpm class digital copier (PPC).

In order to achieve the 65 cpm capability in the ADF document reading, a total amount of time of a document transporting time and a document holding time for all of the 65 sheets of the document must be within a range of one minute.

Moreover, the document holding time is not something that may be given perfunctorily, but must allow for enough time necessary for data processing. For this reason, the document holding time cannot be made shorter than a certain amount of time.

So, after subtracting the total document holding time, there is left only a very limited amount of time usable for transporting the 65 sheets of document, which means that the transporting speed must be significantly high.

Likewise, when reading the manually placed document, if the reading magnification is the same as in the ADF document reading, then the scanning carriage will be driven at the same driving speed as in the above transportation speed.

However, if the scanning carriage is to be moved at a high speed within a short time in the manual document reading, there is a concern for deterioration in image quality due to vibration, because the vibration generated during acceleration of the scanning carriage will be still present when the image reading operation is started.

In order to reduce the vibration, an expensive motor has to be used as the scanning carriage driving motor, or a rigid anti-vibration structure must be provided for the scanning carriage as well as providing a travel distance long enough for the scanning carriage.

In order to provide such a sufficient distance for the acceleration of the scanning carriage, the scanner unit must be made bigger, for example.

BRIEF SUMMARY OF THE INVENTION

An object of the present invention is to provide an image reading device in which the manually placed document reading speed is differentiated from the ADF document reading speed so as to reduce the vibration of image during the manual document reading, thereby eliminating the need for utilization of an expensive motor as the scanning carriage driving motor or the need for increasing the distance of the scanning carriage movement, and avoiding increase in the size of the scanning unit.

In order to achieve the above object, according to the present invention, there is provided:

(1) an image reading device operable in a manually placed document reading mode offered by a manually placed document reading means and an ADF document reading mode offered by an ADF document reading means, comprising:

reading mode detecting means which detects in which mode of the manually placed document reading mode and the ADF document reading mode a document to be read is in;

first reading-speed setting means which sets a reading speed of the ADF document reading means to a predetermined reading speed, upon detection by the reading mode detecting means that the document to be read is in the ADF document reading mode; and second reading-speed setting means which sets a reading speed of the manually placed document reading means to a predetermined reading speed sufficient to reduce image vibration in a result of reading by the manually placed document reading means, upon detection by the reading mode detecting means that the document to be read is in the manually placed document reading mode.

Further, in order to achieve the above object, according to the present invention, there is provided:

(2) an image reading device pursuant to (1), wherein the second reading-speed setting means sets, as a moving speed of a scanning carriage utilized in the manually placed document reading means, a speed sufficient to reduce residual vibration in the scanning carriage, in order to set the reading speed for the manually placed document reading means to a speed sufficient for the reduction of image vibration as a result of the reading by the manually placed document reading means.

Further, in order to achieve the above object, according to the present invention, there is provided:

(3) an image reading device pursuant to (1), wherein the second reading-speed setting means sets to a speed sufficient to reduce image vibration caused by the reading by the manually placed document reading means and sufficient to guarantee a printing operation of a printer main body for simultaneous printing at a predetermined speed, of the result of the reading by the manually placed document reading means.

Further, in order to achieve the above object, according to the present invention, there is provided:

(4) an image reading device pursuant to (2), wherein the second reading-speed setting means sets, as a moving speed of a scanning carriage utilized in the manually placed document reading means, a speed sufficient to reduce residual vibration in the scanning carriage, in order to set the reading speed of the manually placed document reading means to a speed sufficient for the reduction of image vibration caused by the reading by the manually placed document reading means and sufficient to guarantee a printing operation of a printer main body for simultaneous printing at a predetermined speed, of the result of the reading by the manually placed document reading means.

Further, in order to achieve the above object, according to the present invention, there is provided:

(5) an image reading method operable in a manually placed document reading mode offered by a manually placed document reading means and an ADF document reading mode offered by an ADF document reading means, comprising:

detecting which mode of the manually placed document reading mode and the ADF document reading mode a document to be read is in;

setting a reading speed for the ADF document reading means to a predetermined reading speed, upon detection that the document to be read is in the ADF document reading mode; and setting a reading speed for the manually placed document reading means to a predetermined reading speed sufficient to reduce image vibration as a result of the reading by the manually placed document reading means, upon detection that the document to be read is in the manually placed document reading mode.

Further, in order to achieve the above object, according to the present invention, there is provided:

(6) an image reading device operable in a manually placed document reading mode offered by a manually placed document reading means and an ADF document reading mode offered by an ADF document reading means, comprising:

reading mode detecting means which detects in which mode of the manually placed document reading mode and the ADF document reading mode a document to be read is in;

first reading-speed setting means which sets a reading speed for the ADF document reading means to a predetermined reading speed, upon detection by the reading mode detecting means that the document to be read is in the ADF document reading mode; and second reading-speed setting means which sets a reading speed for the manually placed document reading means to a speed slower than the reading speed for the ADF document reading means, upon detection by the reading mode detecting means that the document to be read is in the manually placed document reading mode.

Further, in order to achieve the above object, according to the present invention, there is provided:

(7) an image reading device pursuant to (6), wherein the second reading-speed setting means sets, as a moving speed of a scanning carriage utilized in the manually placed document reading means, a speed sufficient to reduce residual vibration in the scanning carriage, in order to reduce the reading speed for the manually placed document reading means to the speed slower than the reading speed for the ADF document reading means sufficient to reduce image vibration as a result of reading by the manually placed document reading means.

Further, in order to achieve the above object, according to the present invention, there is provided:

(8) an image reading device pursuant to (6), wherein the second reading-speed setting means reduces the reading speed of the manually placed document reading means to a speed slower than the reading speed of the ADF document reading means sufficient to reduce image vibration as a result of reading by the manually placed document reading means and sufficient to guarantee a printing operation of a printer main body for simultaneous printing at a predetermined speed, as a result of reading by the manually placed document reading means.

Further, in order to achieve the above object, according to the present invention, there is provided:

(9) an image reading device pursuant to (6), wherein the second reading-speed setting means sets, as a moving speed of a scanning carriage utilized in the manually placed document reading means, a speed sufficient to reduce residual vibration in the scanning carriage, in order to reduce the reading speed of the manually placed document reading means to a speed slower than the reading speed of the ADF document reading means sufficient to reduce image vibration as a result of reading by the manually placed document reading means and sufficient to guarantee a printing operation of a printer main body for simultaneous printing at a predetermined speed, of a result of reading by the manually placed document reading means.

Further, in order to achieve the above object, according to the present invention, there is provided:

(10) an image reading method operable in a manually placed document reading mode offered by a manually placed document reading means and an ADF document reading mode offered by an ADF document reading means, comprising:

detecting which mode of the manually placed document reading mode and the ADF document reading mode a document to be read is in;

setting a reading speed for the ADF document reading means to a predetermined reading speed upon detection that the document to be read is in the ADF document reading mode; and setting a reading speed for the manually placed document reading means to a reading speed slower than the reading speed for the ADF document reading means, upon detection that the document to be read is in the manually placed document reading mode.

Further, in order to achieve the above object, according to the present invention, there is provided:

(11) an image reading device operable in a manually placed document reading mode offered by a manually placed document reading means and an ADF document reading mode offered by an ADF document reading means, comprising:

reading mode detecting means which detects in which mode of the manually placed document reading mode and the ADF document reading mode a document to be read is in; and reading speed changing means which switches between a reading speed for the manually placed document reading means set upon the detection by the reading mode detecting means that the document to be read is in the manually placed document reading mode and a reading speed for the ADF document reading means set upon the detection that the document to be read is in the ADF document reading mode.

Further, in order to achieve the above object, according to the present invention, there is provided:

(12) an image reading device pursuant to (11), wherein the second reading-speed setting means sets, as a moving speed of a scanning carriage utilized in the manually placed document reading means, a speed sufficient to reduce residual vibration in the scanning carriage, in order to change from the reading speed of the ADF document reading means to the reading speed of the manually placed document reading means sufficient to reduce image vibration in a result of reading by the manually placed document reading means.

Further, in order to achieve the above object, according to the present invention, there is provided:

(13) an image reading device pursuant to (11), wherein the second reading-speed setting means changes the reading speed of the manually placed document reading means from the reading speed of the ADF document reading means, to a speed sufficient to reduce image vibration as a result of reading by the manually placed document reading means and sufficient to guarantee a printing operation of a printer main body for simultaneous printing at a predetermined speed, of the result of the reading by the manually placed document reading means.

Further, in order to achieve the above object, according to the present invention, there is provided:

(14) an image reading device pursuant to (11), wherein the second reading-speed setting means sets, as a moving speed of a scanning carriage utilized in the manually placed document reading means, a speed sufficient to reduce residual vibration in the scanning carriage, in order to change the reading speed of the manually placed document reading means from the reading speed of the ADF document reading means to a speed sufficient to reduce image vibration in a result of reading by the manually placed document reading means and sufficient to guarantee a printing operation of a printer main body for simultaneous printing at a predetermined speed, of the result of the reading by the manually placed document reading means.

Further, in order to achieve the above object, according to the present invention, there is provided:

(15) an image reading method operable in a manually placed document reading mode offered by a manually placed document reading means and an ADF document reading mode offered by an ADF document reading means, comprising:

detecting which mode of the manually placed document reading mode and the ADF document reading mode a document to be read is in; and changing between a reading speed of the manually placed document reading means set upon the detection by the reading mode detecting means that the document to be read is in the manually placed document reading mode and a reading speed of the ADF document reading means set upon the detection that the document to be read is in the ADF document reading mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIGS. 4A and 4B are timing charts showing a case in which the scanner unit incorporating the image reading device according to an embodiment of the present invention performs document reading in the manually placed document reading mode, and the image read by the scanner unit is printed by a printer main body;

DETAILED DESCRIPTION OF THE INVENTION

Figure 1:
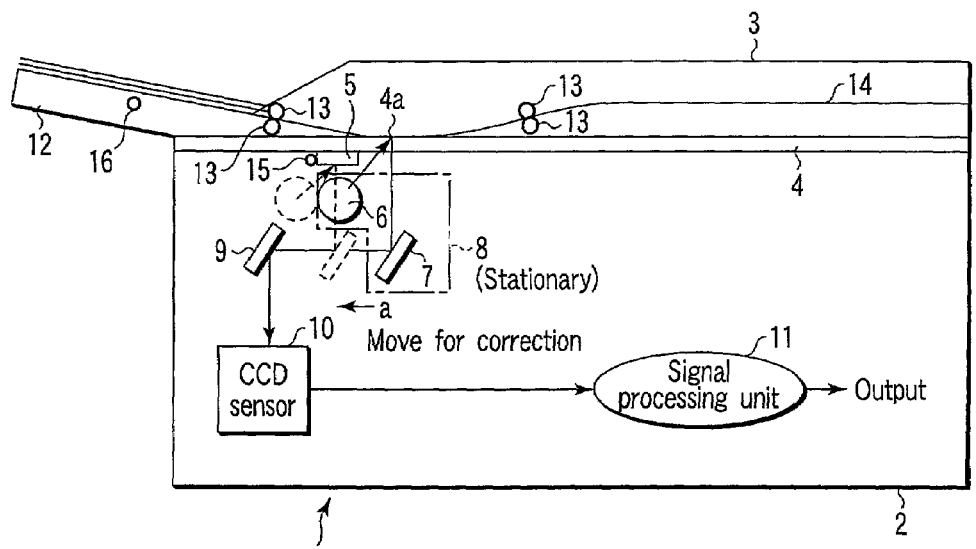
FIG. 1 is a schematic diagram showing an outline configuration of a scanner unit, in an ADF document reading mode, incorporating an image reading device according to an embodiment of the present invention.

Reference will now be made in detail to the presently preferred embodiments of the invention as illustrated in the accompanying drawings, in which like reference numerals designate like or corresponding parts.

First, an outline of the present invention will be described.

Specifically, consider an image reading device operable in both a manually placed document reading mode offered by a manually placed document reading means and an ADF document reading mode offered by an ADF document reading means. In the ADF document reading mode, because types of transportable documents are limited, priority must be placed not on reading accuracy, but rather on a document reading speed itself, such as 65 cpm.

On the contrary, in the manually placed document reading mode, since it is impossible to continually replace the documents at high speed, it is believed that priority must be placed not on increasing the reading speed, but rather on a document reading accuracy itself.

Therefore, in the present invention, it is intended that in an image reading device operable in both the manually placed document reading mode offered by the manually placed document reading means and the ADF document reading mode offered by the ADF document reading means, the manually placed document reading speed is differentiated from the ADF document reading speed, so as to reduce the vibration of an image caused by the vibration of the scanning carriage during the movement of the scanning carriage in the manually placed document reading means, whereby the reading accuracy is improved.

As mentioned above, in the ADF document reading mode, a certain level of document transportation speed must be offered in order to achieve a given document reading speed such as 65 cpm.

On the other hand, in the manually placed document reading mode, a minimum requirement, for example, is that the reading should be performed at a speed sufficient to finish the reading by the time a document (image data) has been copied (printed out simultaneously). Thus, there is no need for the reading speed to be the same as the reading speed in the ADF document reading mode.

Herein, an approach is taken, in which the moving speed of the scanning carriage is set so as to reduce the reading speed in the manually placed document reading mode relative to the reading speed in the ADF document reading mode.

With the above, according to the present invention, it has been made possible to reduce the vibration of the image that is caused by the vibration of the scanning carriage during the scanning carriage movement in the manually placed document reading mode, and thus to improve the reading accuracy.

Therefore, if the above present invention can be realized, it becomes possible to offer an image reading device which, unlike the prior art, no longer needs to use an expensive motor as the scanning carriage driving motor, to provide a rigid anti-vibration structure for the scanning carriage, or to provide a travel distance long enough for the scanning carriage, and can avoid an increase in the size of the scanning unit.

Next, an image reading device and method according to an embodiment of the present invention based on the outline given above will be described with reference to the drawings.

FIG. 1 is a diagram showing an outline configuration of a scanner unit 1 to which the image reading device and method according to the present invention is applied.

The scanner unit 1 comprises a main body 2 incorporating an optical system for reading and a sheet-feeder type automatic document feeder (hereinafter called ADF) 3 which is mounted on an upper portion of the main body 2 and can be opened and closed.

Specifically, the ADF 3 is used in a closed state as shown in FIG. 1, when a document is read in the ADF document reading mode.

On an upper surface of the main body 2 and on the border with the ADF 3, a document table 4 made of a flat plate of transparent glass is provided.

Figure 2:
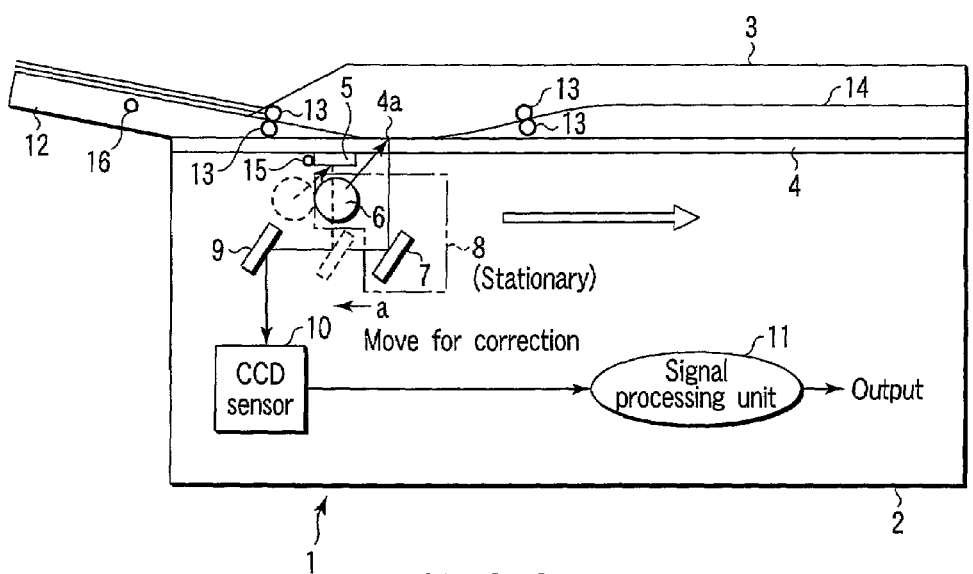
FIG. 2 is a schematic diagram showing an outline configuration of the scanner unit, in a manual document reading mode, incorporating the image reading device according to an embodiment of the present invention.

Specifically, as shown in FIG. 2, the document table 4 is used as a manually placed document reading means when the document is read in the manually placed document reading mode.

In this case, as shown by the broken lines in FIG. 2, the ADF 3 is first opened, then the document is manually placed on the document table 4, and finally the ADF 3 is closed.

Below the document table 4, there is provided a first photo interrupter 15 serving as a manually placed document mode detecting means which detects that the document to be read by the scanner unit 1 is set in the manually placed document reading mode when the presence of the document is detected on the document table 4.

The ADF 3 includes: a supply tray 12 capable of supplying a plurality of documents in a bunch; a transporting system 13 provided, for example, by a transporting roller which captures and transports the document placed in the supply tray 12, sheet by sheet, at a predetermined speed in the sub-scanning direction via a document illuminating location 4a to be described later; a discharge tray 14 for receiving the document which has been transported by the transporting system 13 and passed through the document illuminating location 4a; and a second photo interrupter 16 serving as an ADF document reading mode detecting means which detects that the document to be read by the scanner unit 1 is set in the ADF document reading mode when supply of the document is detected in the supply tray 12.

The document illuminating location 4a referred to in the ADF document reading mode is at the left extreme end on the surface of the document table 4 as shown in the figure.

The main body 2 incorporates a scanning carriage 8 at a predetermined position that corresponds to the document illuminating location 4a in a stationary state (See FIG. 1) or in a state movable in the sub-scanning direction (See FIG. 2).

The scanning carriage 8 is mounted with a xenon lamp 6 serving as an illuminating lamp, and a mirror 7.

Whether the scanning carriage 8 is in its stationary state or a movable state, the xenon lamp 6 provides an illuminating location which is fixed at the document illuminating location 4a (See FIG. 1) or successively moving (See FIG. 2) from the document illuminating location 4a in the sub-scanning direction.

Specifically, in document reading in the ADF document reading mode, the scanning carriage 8 is held stationary at a predetermined position (See FIG. 1), so the illuminating location by the xenon lamp 6 is fixed at the document illuminating location 4a.

In the ADF document reading mode, since the scanning carriage 8 is stationary at the predetermined position, the illuminating location of the xenon lamp 6 is fixed at the document illuminating location 4a. Under this state, the xenon lamp 6 emits a ray of light having a certain width covering a document reading region which extends in the main scanning directions (a longitudinal direction of the xenon lamp 6), whereby part of the document under transportation at a predetermined speed as described above is illuminated, making it possible to read the entire document.

On the other hand, in the manually placed document reading mode, as shown in FIG. 2, the scanning carriage 8 is moved from the predetermined position corresponding to the document illuminating location 4a in the sub-scanning direction indicated by arrow A at a speed to be described later. With this movement, the xenon lamp 6 is moved successively in the sub-scanning direction while emitting light having the certain width covering the document reading region which extends in the main scanning direction, whereby part of the document placed at a fixed location is illuminated, making possible to read the entire document.

Near the document table 2, there is provided a white standard plate 5 for generating a white standard signal to be used in shading correction.

This white standard plate 5 is illuminated before commencing the document reading, by the xenon lamp 6 which serves as a source of the illuminating light and has been moved to the position shown by the broken lines in the figure. The reflected light is introduced into the CCD line sensor 10 to be described later.

The main body 2 further incorporates a mirror 9 and the CCD line sensor 10.

The mirror 9 is fixed in the main body 2.

With the above arrangement, the reflected light from the document illuminating location 4a by the xenon lamp 8 or reflected light from the entire document is introduced into the CCD line sensor 10 via the mirrors 7, 9 and an image forming lens (not illustrated).

The CCD line sensor 10 performs a photoelectric transfer responding to the in-coming light, and outputs an electric signal in accordance with the reflected light.

The electric signal outputted by the CCD line sensor 10 is supplied to a signal processing unit 11.

The signal processing unit 11 performs such processes as amplification, A/D conversion, and shading correction to the electric signal outputted by the CCD line sensor 10.

Image data processed by the signal processing unit 11 is outputted to an unillustrated external component such as a PC (personal computer) and a printer.

Figure 3:
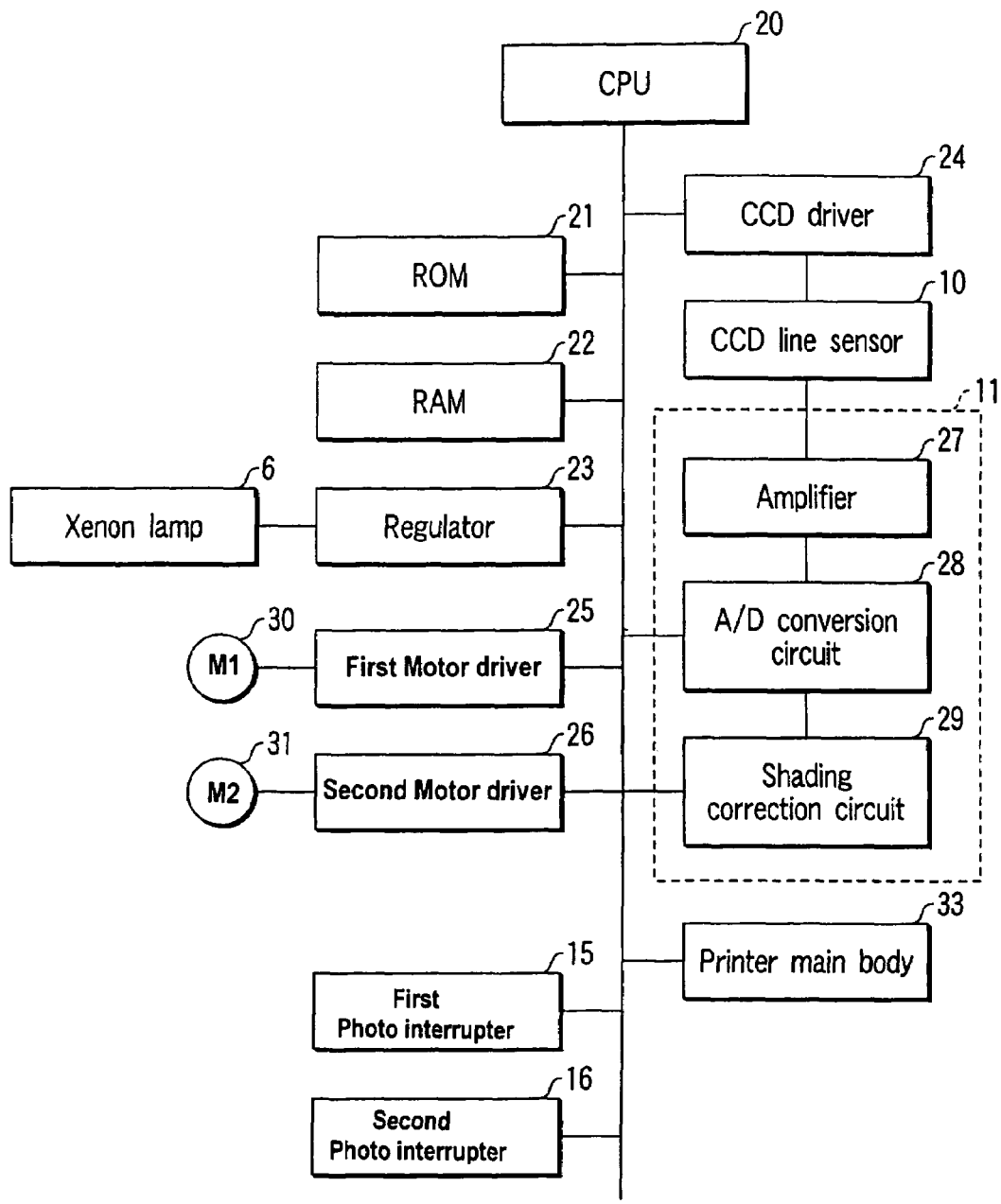
FIG. 3 is a block diagram outlining a control system of the scanner unit incorporating the image reading device according to an embodiment of the present invention.

FIG. 3 is a block diagram showing a controlling system of the scanner unit 1.

Specifically, the controlling system of the scanner unit 1 includes a CPU 20 performing overall control, a ROM 21 storing a controlling program and so on, RAM 22 for storage of various data, a regulator 23 for controlling a turn-on action of the xenon lamp 6, a CCD driver 24 for driving the CCD line sensor 10, a first motor driver 25 for driving a first motor (M1) 30 which moves the scanning carriage 8, a second motor driver 26 for driving a second motor (M2) 31 which drives the transporting system 13, and the signal processing unit 11 mentioned earlier.

The signal processing unit 11 includes an amplifier 27 for amplifying an analog signal supplied from the CCD line sensor 10, an A/D conversion circuit 28 for converting the analog signal amplified by the amplifier 27 into a digital signal, and a shading correction circuit 29 for correcting the electric signal from the CCD line sensor 10 in order to compensate for e.g. aging of the xenon lamp 6 by using a shading correction value (standard signal).

The shading correction value is a value for correcting signal errors contained in the electric signal from the CCD line sensor 10, due to inconsistency in the illumination by the xenon lamp 6 serving as the source of illuminating light, ambient temperature change and so on. The value is obtained from an electric signal from the CCD line sensor 10 based on an amount of light reflected by the white standard plate 5.

The A/D conversion circuit 28 and the shading correction circuit 29 are connected to the CPU 20 so that data can be exchanged.

Also, the first photo interrupter 15 as the manually placed document mode detecting means which detects that the document to be read by the scanner unit 1 is set in the manually placed document reading mode, and the second photo interrupter 16 as the ADF document reading mode detecting means which detects that the document to be read by the scanner unit 1 is set in the ADF document reading mode are connected to the CPU 20.

Further, the CPU 20 is connected with an internal printer integrally incorporated with the scanner unit 1 or connected with a printer main body 33 serving as an external printer.

With the above described arrangement, when the second photo interrupter 16 as the ADF document reading mode detecting means detects that a document is supplied in the supply tray 12 of the ADF 3, the CPU 20 determines that the document to be read by the scanner unit 1 is set in the ADF document reading mode, and supplies via the second motor driver 26 a control signal for controlling the second motor (M2) 31 that drives the transporting system 13, so that the document can be read at a predetermined speed, of 65 cpm for example.

Further, when the first photo interrupter 15 as the manually placed document reading mode detecting means detects that a document is manually placed on the document table 4, the CPU 20 determines that the document to be read by the scanner unit 1 is set in the manually placed document reading mode, and supplies via the first motor driver 25 a control signal for controlling the first motor (M1) 30 that drives the scanning carriage 8, so that the document can be read at a predetermined speed to be described later, which is a different speed from the ADF document reading speed.

Next, operation of the scanner unit 1 configured as above as the image reading apparatus will be described.

First, the description will cover a photocopying operation, in which document reading is performed under the manually placed document reading mode by the scanner unit 1, and the image read by the scanner unit 1 is printed out simultaneously by the printer main body 33. Reference will be made to FIGS. 4A and 4B.

FIGS. 4A and 4B are timing charts showing a case in which the scanner unit 1 performs the document reading operation in the manually placed document reading mode, and the image read by the scanner unit 1 is printed simultaneously by a printer main body 33.

First, an outline of the operation will be described.

When a start key (not illustrated) is pressed, a start signal is sent to the scanner unit 1, whereupon the CPU 20 performs the simultaneous operation of the scanner unit 1 and the printer main body 33.

Under this operation, in the printer main body 33, upon a paper feeding command, an aging action of a processing unit which is the unit that forms the image is started. A sheet of paper is taken out of a paper supply cassette (not illustrated), and brought to a stand-by position, or at a registration roller (not illustrated) disposed before the processing unit (not illustrated).

With the above, if the printer main body 33 has stored in its memory a predetermined amount (10% approx.) of the image read by the scanner unit 1 by the end of the stand-by time (1500 ms approx.), it is possible to finish the printing without coming behind the next cycle of the printing operation.

Next, specific operations will be described.

As shown in FIG. 4A, when the start key is pressed on the scanner unit 1, a scan command is received from the CPU 20, and the scanning operation is started.

Herein, as described above, the printer main body 33 can store in its memory approximately 10% of the image read by the scanner 1 in approximately 1500 ms after the scanner unit 1 is started.

Then, as shown in FIG. 4B, in the printer main body 33, the paper feeding command from the CPU 20 is received and the process aging is performed, and then a sheet of paper is supplied from the paper supply cassette to the registration roller, within 1700 ms. Take this condition as sufficient to achieve the speed of 65 cpm, without coming behind the next cycle of printing operation. Then, there is a given margin of:

1700 ms−1500 ms=200 ms

This time margin allows the scanner unit 1 to use a setting for the moving speed of the scanning carriage 8 as slow as possible (for example, a manually placed document reading speed as approximately 70% of the ADF document reading speed).

Specifically, for the moving speed of the scanning carriage 8, a slower speed is more advantageous in order to reduce residual vibration in the scanning carriage 8 itself.

Figure 5:
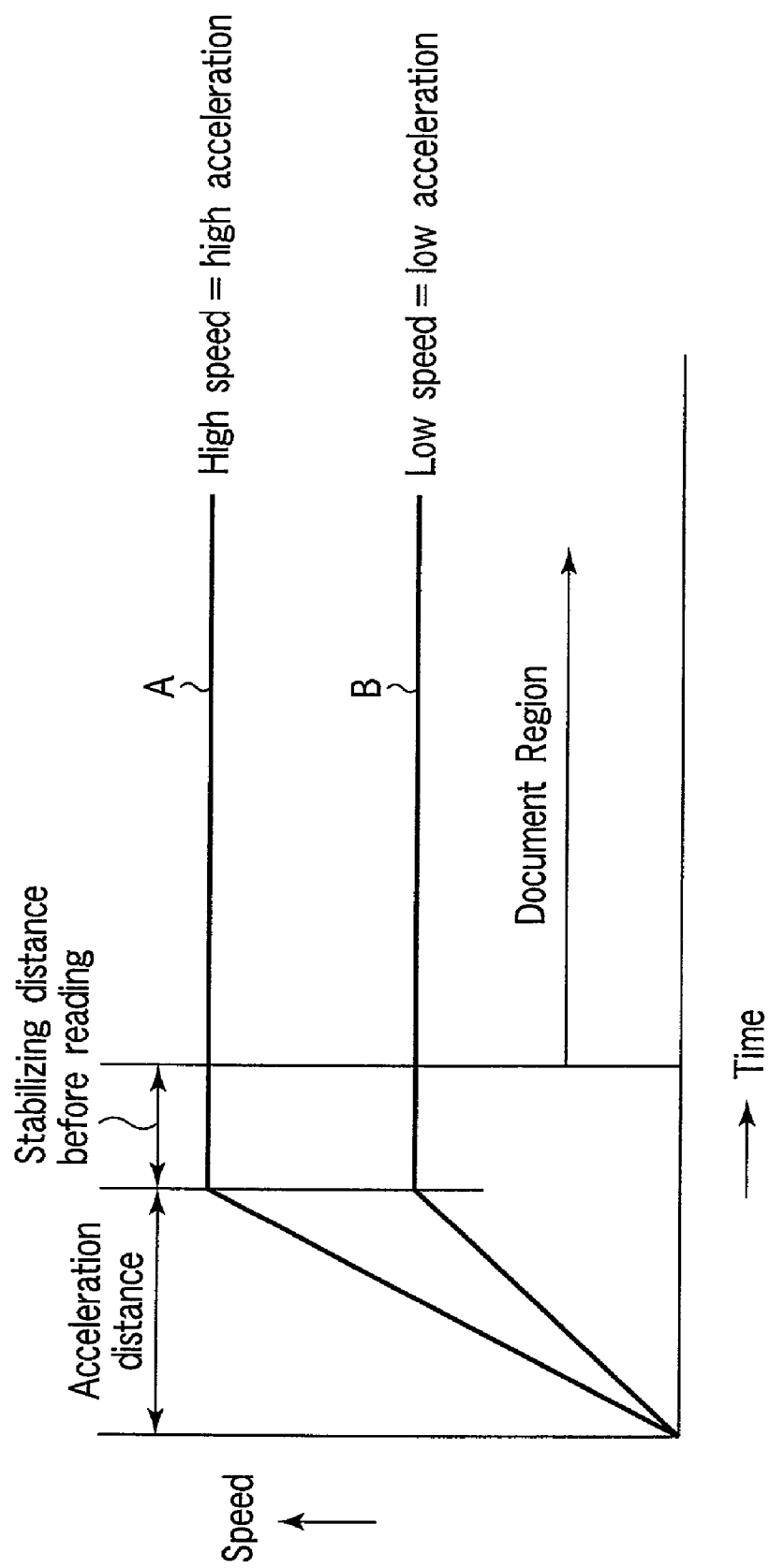
FIG. 5 shows a relationship between time and moving speed of a scanning carriage as a comparison between a prior art scanner unit and a scanner unit according to the present invention.

FIG. 5 shows a relationship between time and the moving speed of the scanning carriage as a comparison between the prior art scanner unit and the scanner unit according to the present invention.

According to the prior art scanner unit, as shown in curve A in FIG. 5, the manually placed document reading speed is set the same as the ADF document reading speed, and structural limitations in the scanner unit put a limitation on a distance in which the scanning carriage can be accelerated. Further, a certain distance must be provided before a starting point of the document reading. Given the conditions as above, a higher moving speed of the scanning carriage is more advantageous, and therefore, a high value is selected for the acceleration as a matter of course.

Figure 6A:
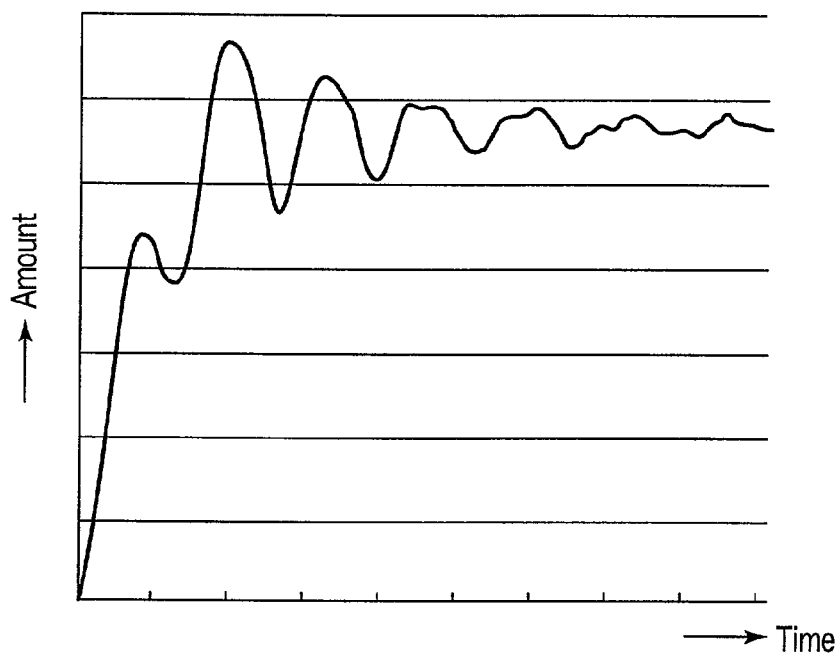
FIGS. 6A and 6B show measurement results of residual vibration in the scanning carriage of the prior art scanner unit and the scanner unit according to the present invention, under different acceleration conditions.

As has been described, according to the prior art scanner unit, this high acceleration causes a large vibration in the scanning carriage 8 as shown in FIG. 6A, making it impossible to reduce residual vibration in the scanning carriage 8 when the scanning carriage comes to constant-velocity moving to begin the document reading.

On the contrary, according to the scanner unit 1 offered by the present invention, as shown in curve B in FIG. 5, the manually placed document reading speed is not set the same as the ADF document reading speed, but set for example to approximately 70 percent of the ADF document reading speed as a specific manually placed document reading speed. Because of this setting, even if the acceleration distance of the scanning carriage 8 is the same as in the prior art, it becomes possible to reduce the acceleration of the scanning carriage 8.

With this arrangement, according to the scanner unit 1 offered by the present invention, since the acceleration of the scanning carriage is small, it becomes possible to reduce residual vibration in the scanning carriage 8 itself when the scanning carriage comes to constant-velocity moving to begin the document reading.

Figure 6B:
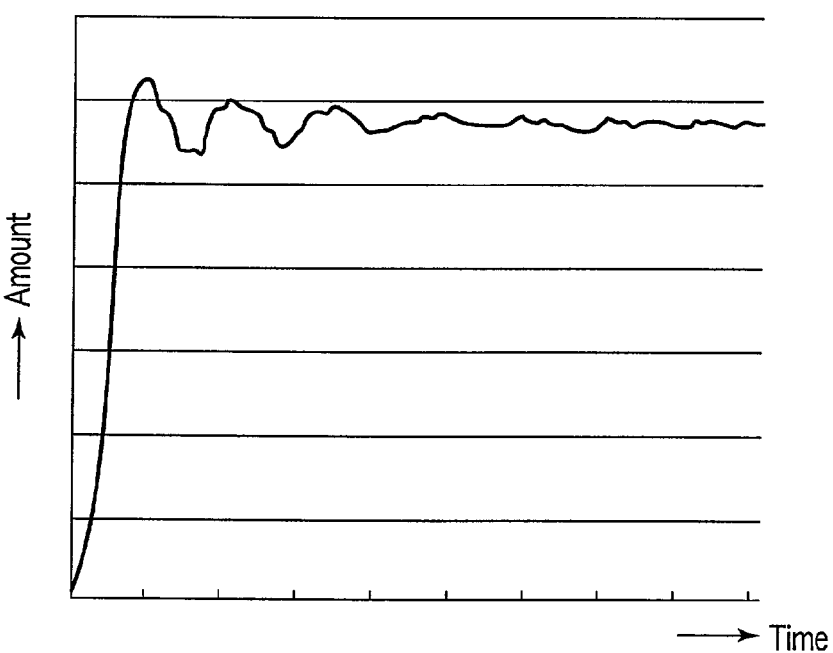

Specifically, FIGS. 6A and 6B show measurement results of residual vibration in the scanning carriage of the prior art scanner unit and of the scanner unit according to the present invention, under different acceleration conditions.

According to the measurement result for the prior art scanner unit shown in FIG. 6A, the high acceleration of the scanning carriage causes a large residual vibration in the scanning carriage 8. On the other hand, according to the measurement result for the scanner unit 1 offered by the present invention shown in FIG. 6B, the low acceleration causes a small residual vibration in the scanning carriage 8.

As has been described above, in the scanner unit 1, in order to reduce the residual vibration in the scanning carriage 8 within a limited acceleration distance, it is advantageous to reduce the maximum speed of the scanning carriage 8.

In addition, since the moving speed of the scanning carriage 8 can be reduced, a torque required is small. This provides a cost advantage that a non-expensive motor can be utilized as the first motor (M1) 30 for moving the scanning carriage 8.

With the above arrangement, according to the scanner unit 1 offered by the present invention, a slower reading speed than the ADF document reading speed is provided for reading the manually placed document, separately from the 65 cpm cycle provided for the printer main body 33, thereby making possible to reduce the residual vibration of the scanning carriage and to perform a high quality reading to a manually placed document, giving a better quality of image.

Therefore, as has been described above, according to the present invention, it is possible to provide an image reading device and a method in which the manually placed document reading speed is differentiated from the ADF document reading speed so as to reduce the vibration of image during the reading of a manually placed document, thereby eliminating the need for utilization of an expensive motor as the scanning carriage driving motor, the need for providing the scanning carriage with a rigid anti-vibration structure, or the need for increase the distance of the scanning carriage movement, and avoiding an increase in the size of the scanning unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading device operable in a manually placed document reading mode offered by a manually placed document reading means which reads a document placed on a document table made of transparent glass by means of a scannig carriage which moves at a predetermined speed and an ADF document reading mode offered by an ADF document reading means which reads a document transported by an ADF by means of the scanning carriage which has been in a stopping state, comprising:

reading mode detecting means which detects in which mode of the manually placed document reading mode and the ADF document reading mode a document to be read is in;

first reading-speed setting means which sets a reading speed of the ADF document reading means defined by a document transportation speed by the ADF to a predetermined first reading speed, upon detection by the reading mode detecting means that the document to be read is in the ADF document reading mode; and second reading-speed setting means which sets a reading speed of the manually placed document reading means defined by a moving speed of the scanning carriage to a predetermined second reading speed sufficient to reduce image vibration in a result of reading by the manually placed document reading means, upon detection by the reading mode detecting means that the document to be read is in the manually placed document reading mode, wherein the first reading-speed setting means changes the predetermined first reading speed defined by the document transportation speed by the ADF to be a high speed that enables a required number of sheets to be read per unit time, and the second reading-speed setting means changes the predetermined second reading speed defined by the moving speed of the scanning carriage to be a speed slower than the predetermined first reading speed.

2. An image reading device according to claim 1, wherein the second reading-speed setting means sets, as a moving speed of the scanning carriage utilized in the manually placed document reading means, a speed sufficient to reduce residual vibration in the scanning carriage, in order to set the second reading speed for the manually placed document reading means defined by the moving speed of the scanning carriage to a speed sufficient for the reduction of image vibration as a result of the reading by the manually placed document reading means.

3. An image reading device according to claim 1, wherein the second reading-speed setting means sets the second reading speed defined by the moving speed of the scanning carriage to a speed sufficient to reduce image vibration caused by the reading by the manually placed document reading means and sufficient to guarantee a printing operation of a printer main body for simultaneous printing at a predetermined speed, of the result of the reading by the manually placed document reading means.

4. An image reading device according to claim 1, wherein the second reading-speed setting means sets, as a moving speed of the scanning carriage utilized in the manually placed document reading means, a speed sufficient to reduce residual vibration in the scanning carriage, in order to set the second reading speed of the manually placed document reading means defined by the moving speed of the scanning carriage to a speed sufficient for the reduction of image vibration caused by the reading by the manually placed document reading means and sufficient to guarantee a printing operation of a printer main body for simultaneous printing at a predetermined speed, of the result of the reading by the manually placed document reading means.

5. An image reading method operable in a manually placed document reading mode offered by a manually placed document reading means which reads a document placed on a document table made of transparent glass by means of a scanning carriage which moves at a predetermined speed and an ADF document reading mode offered by an ADF document reading means which reds a document transported by an ADF by means of the scanning carriage which has been in a stopping state, comprising:

detecting which mode of the manually placed document reading mode and the ADF document reading mode a document to be read is in;

setting a reading speed for the ADF document reading means defined by a document transportation speed by the ADF to a predetermined first reading speed, upon detection that the document to be read is in the ADF document reading mode; and setting a reading speed for the manually placed document reading means defined by a moving speed of the scanning carriage to a predetermined second reading speed sufficient to reduce image vibration as a result of the reading by the manually placed document reading means, upon detection that the document to be read is in the manually placed document reading mode, wherein said setting to the first reading speed changes the predetermined first reading speed defined by the document transportation speed by the ADF to be a high speed that enables a required number of sheets to be read per unit time, and said setting to the second reading speed changes the predetermined second reading speed defined by the moving speed of the scanning carriage to be a speed slower than the predetermined first reading speed.

6. An image reading device operable in a manually placed document reading mode offered by a manually placed document reading means which reads a document placed on a document table made of transparent glass by means of a scanning carriage which moves at a predetermined speed and an ADF document reading mode offered by an ADF document reading means which reads a document transported by an ADF by means of the scanning carriage which has been in a stopping state, comprising:

reading mode detecting means which detects in which mode of the manually placed document reading mode and the ADF document reading mode a document to be read is in;

first reading-speed setting means which sets a reading speed for the ADF document reading means defined by a document transportation speed by the ADF to a predetermined first reading speed, upon detection by the reading mode detecting means that the document to be read is in the ADF document reading mode; and second reading-speed setting means which sets a reading speed for the manually placed document reading means defined by the moving speed of the scanning carriage to a predetermined second reading speed slower than the predetermined first reading speed for the ADF document reading means, upon detection by the reading mode detecting means that the document to be read is in the manually placed document reading mode, wherein the first reading-speed setting means changes the predetermined first reading speed defined by the document transportation speed by the ADF to be a high speed that enables a required number of sheets to be read by unit time, and the second reading-speed setting means changes the predetermined second reading speed defined by the moving speed of the scanning carriage to be a speed slower than the predetermined first reading speed and sufficient for the reduction of image vibration as a result of the reading by the manually placed document reading means.

7. An image reading device according to claim 6, wherein the second reading-speed setting means sets, as a moving speed of the scanning carriage utilized in the manually placed document reading means, a speed sufficient to reduce residual vibration in the scanning carriage, in order to reduce the second reading speed for the manually placed document reading means defined by the moving speed of the scanning carriage to the speed slower than the reading speed for the ADF document reading means sufficient to reduce image vibration in a result of reading by the manually placed document reading means.

8. An image reading device according to claim 6, wherein the second reading-speed setting means reduces the second reading speed of the manually placed document reading means defined by the moving speed of the scanning carriage to a speed slower than the reading speed of the ADF document reading means sufficient to reduce image vibration as a result of reading by the manually placed document reading means and sufficient to guarantee a printing operation of a printer main body for simultaneous printing at a predetermined speed, as a result of reading by the manually placed document reading means.

9. An image reading device according to claim 6, wherein the second reading-speed setting means sets, as a moving speed of a scanning carriage utilized in the manually placed document reading means, a speed sufficient to reduce residual vibration in the scanning carriage, in order to reduce the second reading speed of the manually placed document reading means defined by the moving speed of the scanning carriage to a speed slower than the reading speed of the ADF document reading means sufficient to reduce image vibration as a result of reading by the manually placed document reading means and sufficient to guarantee a printing operation of a printer main body for simultaneous printing at a predetermined speed, of a result of reading by the manually placed document reading means.

10. An image reading method operable in a manually placed document reading mode offered by a manually placed document reading means which reads a document placed on a document table made of transparent glass by means of a scanning carriage which moves at a predetermined speed and an ADF document reading mode offered by an ADF document reading means which reads a document transported by an ADF by means of the scannig carriage which has been in a stopping state, comprising;

detecting which mode of the manually placed document reading mode and the ADF document reading mode a document to be read is in, setting a reading speed for the ADF document reading means defined by a document transportation speed by the ADF to a predetermined first reading speed upon detection that the document to be read is in the ADF document reading mode; and setting a reading speed for the manually placed document reading means, defined by a moving speed of the scanning carriage to a predetermined second reading speed slower than the reading speed for the ADF document reading means, upon detection that the document to be read is in the manually placed document reading mode, wherein said setting to the first reading speed changes the predetermined first reading speed defined by the document transportation speed by the ADF to be a high speed that enables a required number of sheets to be read by unit time, and said setting to the second reading speed changes the predetermined second reading speed defined by the moving speed of the scanning carriage to be a speed slower than the predetermined first reading speed and sufficient for the reduction of image vibration as a result of the reading by the manually placed document reading means.

11. An image reading device operable in a manually placed document reading mode offered by a manually placed document reading means which reads a document placed on a document table made of transparent glass by means of a scanning carriage which moves at a predetermined speed and an ADF document reading mode offered by an ADF document reading means which reads a document transported by an ADF by means of the scanning carriage which has been in a stopping state, comprising:

reading mode detecting means which detects in which mode of the manually placed document reading mode and the ADF document reading mode a document to be read is in; and reading speed changing means which switches between a predetermined first reading speed for the manually placed document reading means defined by a document transportation speed by the ADF set upon the detection by the reading mode detecting means that the document to be read is in the manually placed document reading mode and a predetermined second reading speed for the ADF document reading means defined by a moving speed of the scanning carriage set upon the detection that the document to be read is in the ADF document reading mode, wherein the reading speed changing means changes the predetermined first reading speed defined by the document transportation speed by the ADF to be a high speed that enables a required number of sheets to be read by unit time, and changes the predetermined second reading speed defined by the moving speed of the scanning carriage to be a speed slower than the predetermined first reading speed and sufficient for the reduction of image vibration as a result of the reading by the manually placed document reading means.

12. An image reading device according to claim 11, wherein the reading speed changing means sets, as a moving speed of the scanning carriage utilized in the manually placed document reading means, a speed sufficient to reduce residual vibration in the scanning carriage, in order to change the predetermined first reading speed of the manually placed document reading means to be a speed slower than the redetermined second reading speed of the ADF document reading means and sufficient to reduce image vibration as a result of reading by the manually placed document reading means.

13. An image reading device according to claim 11, wherein the reading speed changing means changes the predetermined first reading speed of the manually placed document reading means to be a speed slower than the predetermined second reading speed of the ADF document reading means, the speed being sufficient to reduce image vibration as a result of reading by the manually placed document reading means and sufficient to guarantee a printing operation of a printer main body for simultaneous printing at a predetermined speed, of the result of the reading by the manually placed document reading means.

14. An image reading device according to claim 11, wherein the reading speed changing means sets, as a moving speed of the scanning carriage utilized in the manually placed document reading means, a speed sufficient to reduce residual vibration in the scanning carriage, in order to change the predetermined first reading speed of the manually placed document reading means to be a speed slower than the predetermined second reading speed of the ADF document reading means the speed being sufficient to reduce image vibration in a result of reading by the manually placed document reading means and sufficient to guarantee a printing operation of a printer main body for simultaneous printing at a predetermined speed, of the result of the reading by the manually placed document reading means.

15. An image reading method operable in a manually placed document reading mode offered by a manually placed document reading means which reads a document placed on a document table made of transparent glass by means of a scanning carriage which moves at a predetermined speed and an ADF document reading mode offered by an ADF document reading means which reads a document transported by an ADF by means of the scanning carriage which has been in a stopping state, comprising:

detecting which mode of the manually placed document reading mode and the ADF document reading mode a document to be read is in; and changing between a predetermined first reading speed of the manually placed document reading means defined by a document transportation speed by the ADF set upon the detection that the document to be read is in the manually placed document reading mode and a predetermined second reading speed of the ADF document reading means defined by a moving speed of the scanning carriage set upon the detection that the document to be read is in the ADF document reading mode, wherein said changing the first reading speeds changes the predetermined first reading speed defined by the document transportation speed by the ADF to be high speed that enables a required number of sheets to be read by unit time, and changes the predetermined second reading speed defined by the moving speed of the scanning carriage to be a speed slower than the predetermined first reading speed and sufficient for the reduction of image vibration as a result of the reading by the manually placed document reading means.

* * * * *